US008369220B1

(12) United States Patent
Khanna et al.

(10) Patent No.: US 8,369,220 B1
(45) Date of Patent: *Feb. 5, 2013

(54) ROUTING A FLOW OF ELASTIC TRAFFIC

(75) Inventors: Bakul Khanna, Lexington, MA (US); Jozef Babiarz, Kanata (CA); Ali Labed, Ottawa (CA); Delfin Montuno, Kanata (CA); Hesham El-Bakoury, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 711 days.

This patent is subject to a terminal disclaimer.

(21) Appl. No.: 12/006,128

(22) Filed: Dec. 31, 2007

Related U.S. Application Data

(63) Continuation-in-part of application No. 11/530,579, filed on Sep. 11, 2006, which is a continuation-in-part of application No. 11/251,252, filed on Oct. 14, 2005.

(60) Provisional application No. 60/716,181, filed on Sep. 12, 2005, provisional application No. 60/708,963, filed on Aug. 17, 2005.

(51) Int. Cl.
H04L 12/26 (2006.01)
(52) U.S. Cl. ........................ 370/235; 370/352
(58) Field of Classification Search .................. 370/230, 370/235, 254, 352, 356, 395.21
See application file for complete search history.

(56) References Cited

U.S. PATENT DOCUMENTS

| 5,745,694 | A | 4/1998 | Egawa |
| 5,832,197 | A | 11/1998 | Houji |
| 6,041,354 | A | 3/2000 | Biliris |
| 6,345,287 | B1 | 2/2002 | Fong |
| 6,366,945 | B1 | 4/2002 | Fong |
| 6,788,646 | B1 * | 9/2004 | Fodor et al. ............ 370/230 |
| 2001/0037401 | A1 | 11/2001 | Soumiya |
| 2003/0021223 | A1 | 1/2003 | Kashyap |
| 2007/0041326 | A1 | 2/2007 | Babiarz et al. |
| 2007/0268841 | A1 * | 11/2007 | Dube et al. ............. 370/254 |
| 2009/0040938 | A1 * | 2/2009 | Klinker ................. 370/252 |

OTHER PUBLICATIONS

Network Working Group Internet Draft, "Basic Specification for IP Fast Reroute: Loop Free Alternates," by A. Atlas, draft ietf rtgwg ipfrr spec base 05, dated Feb. 2006 (26 pages).
Network Working Group Internet Draft, "IP Fast Reroute Framework," draft ietf rtgwg ipfrr framework 05.txt, by Shand, dated Mar. 2006 (14 pages).
U.S. Appl. No. 11/530,579, Final Rejection dated Nov. 25, 2011 (29 pages).
U.S. Appl. No. 11/530,579, Non-Final Rejection dated Mar. 24, 2011 (24 pages).
U.S. Appl. No. 11/530,579, Final Rejection dated Jul. 22, 2010 (20 pages).
U.S. Appl. No. 11/530,579, Non-Final Rejection dated Feb. 1, 2010, pp. 1-18 and attachments.
U.S. Appl. No. 11/530,579, Restriction Requirement dated Aug. 28, 2009 (8 pages).

* cited by examiner

Primary Examiner — Kevin C Harper
Assistant Examiner — Henry Baron
(74) Attorney, Agent, or Firm — Trop Pruner & Hu, P.C.

(57) ABSTRACT

To route a flow of elastic traffic, plural candidate paths are identified for the flow of elastic traffic. A particular path from among the plural candidate paths is selected to route the flow of elastic traffic according to criteria including numbers of flows on respective candidate paths and measured performances of the respective candidate paths.

18 Claims, 3 Drawing Sheets

ROUTING A FLOW OF ELASTIC TRAFFIC

CROSS-REFERENCE TO RELATED APPLICATIONS

This is a continuation-in-part of U.S. Ser. No. 11/530,579, entitled "Route Optimization Using Measured Congestion," having U.S. Patent Application Publication No. 2007/0041326, filed Sep. 11, 2006, which claims priority under 35 U.S.C. §119(e) to U.S. Provisional Application Ser. No. 60/176,181, filed Sep. 12, 2005, and which is a continuation-in-part of U.S. Ser. No. 11/251,252, filed Oct. 14, 2005, which in turn claims priority under 35 U.S.C. §119(e) to U.S. Provisional Application Ser. No. 60/708,963, filed Aug. 17, 2005. Each of the applications identified above is hereby incorporated by reference.

TECHNICAL FIELD

The invention relates to routing a flow of elastic traffic.

BACKGROUND

The types of traffic that can be communicated over a network include elastic traffic and inelastic traffic. Examples of inelastic traffic include real-time traffic such as voice or video, for which some minimum bandwidth must be guaranteed for proper performance. Elastic traffic, on the other hand, is more delay tolerant and has a characteristic that bandwidth for the flow of elastic traffic can be reduced. Usually, elastic traffic attempts to use up whatever bandwidth is available in the network.

Conventional routing protocols for elastic traffic do not provide for effective performance. Some routing protocols, for example, attempt to use shortest routing paths between given endpoints even though there may be other paths available in the network. This may result in the shortest routing paths becoming congested, while other routing paths may continue to be under-utilized. Other routing protocols may route traffic over various paths without any knowledge of whether a particular path is able to provide good or bad performance.

SUMMARY

In general, according to an embodiment, a method of routing a flow of elastic traffic comprises identifying plural candidate paths for the flow of elastic traffic, and selecting a particular path from among the plural candidate paths to route the flow of elastic traffic according to criteria including numbers of flows on respective candidate paths and measured performances of the respective candidate paths.

Other or alternative features will become apparent from the following description, from the drawings, and from the claims.

DETAILED DESCRIPTION

Figure 1:
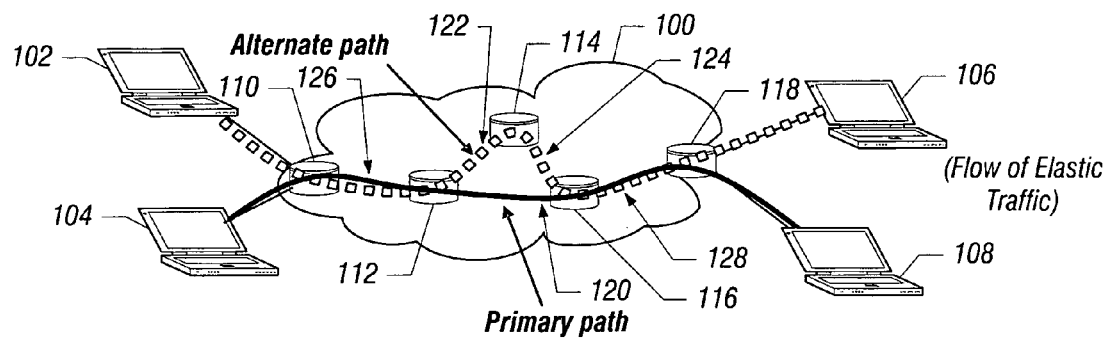
FIGS. 1 and 2 are network diagrams that illustrate flows of elastic traffic, in which embodiments according to some embodiments can be implemented.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a routing protocol is provided to route a flow of traffic that includes at least elastic traffic (and possibly other traffic, such as inelastic traffic). The routing protocol can be implemented in a switch, which can be a layer 2 switch or a layer 3 switch. Examples of layer 3 switches include IP (Internet Protocol) routers, and examples of layer 2 switches include Ethernet switches. In some implementations, a flow can be identified based on the following fields in an IP packet header: source IP address, destination IP address, source port, destination port, and Differentiated Services Code Point (DSCP) value. A DSCP value can be used to identify different quality of service (QoS) processing to be applied to the IP packet.

Elastic traffic refers to traffic for which the communications rate over the network can be reduced when available bandwidth is reduced, and for which the communications rate can be increased when the available bandwidth increases. An example of elastic traffic includes TCP (Transmission Control Protocol) traffic. TCP is described in RFC (Request for Comments) 793, entitled "Transmission Control Protocol," dated September 1981. In one example, RFC (Request for Comments) 1633 (entitled "Integrated Services in the Internet Architecture: An Overview") in Section 3.1 provides an explanation of elastic traffic. In other implementations, other types of elastic traffic can be provided. Although reference is made to "network" in the singular sense, it is noted that the term "network" can actually refer to a single network or a collection of networks.

The routing protocol for elastic traffic is a flow-based routing service, in which traffic packets within a flow are not re-ordered. A flow-based service ensures that once a flow is associated with a particular path, the flow stays with that same path for the life of that flow, so that traffic packets of the flow are not sent out of order to the destination, which would otherwise have to expend resources to correct out-of-order packets. An exception to staying with a particular path for the life of the flow is under blackout conditions, where a next hop may have failed or otherwise become unavailable for some reason.

The routing protocol identifies plural candidate paths for a new flow of elastic traffic. A particular path from among the plural candidate paths is selected to route the flow of elastic traffic according to criteria that includes the following: numbers of flows on respective candidate paths, and measured performances of the respective candidate paths. In one embodiment, new elastic traffic flows are assigned in a round-robin manner to all available candidate paths over which a number of traffic flows is less than a predefined minimum flow count (a predefined threshold). After all candidate paths have achieved the predefined minimum flow count (in other words, each of the candidate paths has a number of traffic flows greater than the predefined minimum flow count), then the candidate path that is selected for a new elastic traffic flow is the path that is able to achieve a highest throughput based on measured performances.

In the presence of a blackout condition (where a portion of a network fails completely due to link or equipment failures or human configuration errors), the corresponding one or more failed paths are removed from the set of alternate candidate paths that are considered. Flows that are associated with the one or more failed paths are then moved to other paths.

Note also that when a new path is added to a set of candidate paths, new flows are assigned to that new path based on the routing protocol. Potential paths to endpoints are identified at each switch prior to receipt of elastic traffic flows by the switch. In one embodiment, the candidate paths include a primary path and one or more alternate paths, which can be stored in a next-hop list. In some embodiments, candidate paths are identified based on next hops. A "next hop" refers the next network element that a flow of traffic can be routed from a first network element.

FIG. 1 shows an example network 100 to interconnect endpoints 102, 104, 106, and 108, which can be computers, network telephones, personal digital assistants (PDAs), and so forth. The network 100 includes various switches 110, 112, 114, 116, and 118. Flows of elastic traffic can travel through the network 100 between endpoints 102, 104, 106, and 108. In FIG. 1, a solid line between switches 110 and 118 represents a primary path between the switches 110 and 118 in the network 100, whereas a dashed line between switches 110 and 118 is considered an alternate path. In the example network 100 of FIG. 1, the primary path includes links 126, 120, and 128 between switches 110 and 118, whereas the alternate path includes links 126, 122, 124, and 128 between switches 110 and 118.

Link 126 is connected between switches 110 and 112, link 120 is connected between switches 112 and 116, link 122 is between switches 112 ad 114, link 124 is between switches 114 and 116, and link 128 is between switches 116 and 118.

At switch 112, for a new flow of elastic traffic from left to right in the network 100, the switch 112 is able to select one of two possible next hops corresponding to the two possible paths illustrated in FIG. 1, based on the elastic traffic flow routing criteria noted above. In other words, the switch 112 is able to select between link 120 and link 122 (that are part of the primary path and alternate path, respectively) based on the elastic traffic flow routing criteria. The switch 112 thus selects between next hop 116 or next hop 114.

The switch 112 has a next-hop list corresponding to possible next hops that can be selected based on the elastic traffic flow routing criteria. In the reverse direction, the switch 116 performs similar routing of new elastic traffic flow between the primary and alternate paths.

Note that for packets associated with a pre-existing elastic traffic flow, the path has already been established so that a switch would just select the next hop associated with such path to route the packets of the pre-existing flow (unless a blackout condition is present in which case a new path would be selected). The route selection process performed by the elastic traffic flow routing protocol thus is route selection for the first packet of a new traffic flow. All remaining packets of the elastic traffic flow follow the same path that was selected for the first packet of the flow.

Although reference is primarily made to routing of elastic traffic flows (e.g., TCP flows) in the description here, it is noted that the elastic traffic flow routing can be performed in conjunction with inelastic traffic flow routing (e.g., routing of real-time traffic), as described in U.S. Patent Application Publication No. 2007/0041326, referenced above. Note also that it is possible that, in some scenarios, a flow of traffic may include mixed elastic and inelastic traffic. Handling of such mixed traffic flow will be described further below.

By using the elastic traffic flow routing protocol according to some embodiments, elastic traffic flows can be routed around congestion or failure points without noticeable service or quality of service (QoS) impact to users. Higher service (transport) availability is provided, since multiple QoS paths are available between source and destination, and if one path fails, new flows are automatically and quickly routed over other available paths. Higher network utilization for elastic traffic flows is also provided, since elastic traffic flows are distributed across all available paths (rather than focused on shortest paths as conventionally performed). Note that paths with lower bandwidths than other paths can be assigned fewer elastic traffic flows than paths that offer higher bandwidth.

Path selection is also automatically based on network measurement values and fairness load balancing, and availability criteria can be evaluated by the routing protocol. By more efficiently using paths in a network for routing elastic traffic flows, congestion of any one path can be reduced such that timeouts associated with TCP or other sessions due to slow communications can be reduced.

The routing protocol can be implemented in switches used in various different types of networks, such as local area networks (LANs), wide area networks (WANs), or other types of networks.

Figure 2:
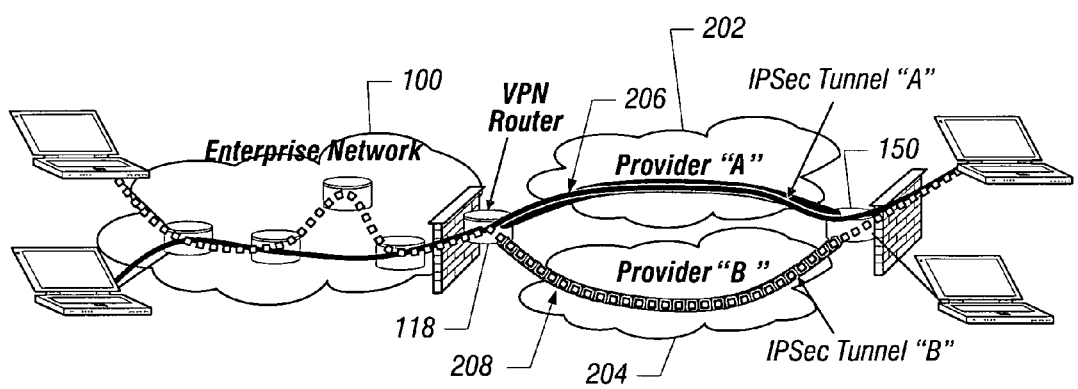

FIG. 2 shows an alternative arrangement that includes the network 100 of FIG. 1, as well as networks 202 and 204 associated with two different service providers (provider A and provider B). A first virtual link 206 can be established between switches 118 and 150 (e.g., edge routers) through the provider A network 202, and a second virtual link 208 can be established between the switches 118 and 150 (e.g., edge routers) through the provider B network 204. The edge routers 118 and 150 can be VPN (Virtual Private Network) routers, and the virtual links can be IPSec (IP Security) tunnels. One of the virtual links 206 and 208 is considered to be part of the primary path, whereas the other of the virtual links 206 and 208 is considered to be part of the alternate path. The edge router 118 or 150 can use the elastic flow routing protocol to select between the two virtual links 206, 208 corresponding to the primary path and alternate path.

Thus, the elastic traffic flow routing protocol can be used for routing elastic traffic flow over different physical links or different virtual links.

Note also that not all of the switches in a network have to use the elastic traffic flow routing protocol in accordance with some embodiments. For those switches that do not use the elastic traffic flow routing protocol, a conventional routing protocol is used, such as routing of traffic over a shortest path, even though alternate paths may exist. However, the more switches in a network that deploy the elastic traffic flow routing protocol according to some embodiments, the better the performance for elastic traffic flows and the higher the network utilization.

As noted above, the elastic traffic flow routing protocol provides protection against blackout conditions (where one portion of a network completely fails). Also, the elastic traffic flow routing protocol protects against brownout conditions, where a portion of a network becomes temporarily unavailable.

Several different mechanisms can be used to identify potential candidate paths. One mechanism for identifying candidate paths to a particular destination is through application of a Reliable Alternate Paths for IP Destination (RAPID) identification process, as described in Network Working Group Internet Draft, "Basic Specification for IP Fast Reroute: Loop-Free Alternates," by A. Atlas, draft-ietf-rtgwg-ipfrr-spec-base-05, dated February 2006, or as described in Network Working Group Internet Draft, "IP Fast Reroute Framework," draft-ietf-rtgwg-ipfrr-framework-05.txt, by Shand, dated March 2006. Another technique of identifying candidate paths is to use pre-configured candidate paths for any given destination.

In some embodiments, the elastic traffic flow routing protocol can use one of two path selection approaches: (1) per-destination approach; or (2) a pre-nexthop approach. In the per-destination approach, the load distribution aims to maximize the per-elastic traffic flow throughput. The consequence of this is that this approach tends to achieve the same throughput for TCP sessions (or other elastic traffic flow sessions) on the various candidate paths. The fairness is with respect to flows traveling to the same destination. In the per-destination path selection approach, the term "destination" refers to the subnet to which the final destination belongs.

The per-nexthop approach is a variant of the per-destination approach, where the destination of the flow is no longer taken into account to load distribute the elastic flows on various candidate paths. In other words, the per-nexthop approach is traffic distribution that is based only on load to the next hop; the new elastic traffic flows will be routed on the next hop that has the best per-elastic traffic flow throughput.

In general, a TCP flow is associated with one or more service classes, as defined by DSCP values of an IP packet, for example. In some implementations, DSCP allows the routing protocol to distinguish a TCP flow from a non-TCP flow. Packets associated with TCP flows contain DSCP fields that are assigned certain one or more DSCP values, whereas packets associated with other types of flows (e.g., inelastic flows such as real-time flows) are assigned other DSCP values.

Note that although reference is made to TCP flows, this discussion also applies to other types of elastic traffic flows.

The elastic traffic flow routing protocol works well when all flows are elastic traffic flows, and all elastic traffic flows consume as much bandwidth as available. In some cases, a TCP flow that is a low bandwidth flow may not satisfy the second criterion above that all TCP flows consume as much bandwidth as possible. Handling of such scenarios is discussed further below. Also, handling of mixed flows (that contain both elastic traffic packets and inelastic traffic packets) is also discussed further below.

Figure 3:
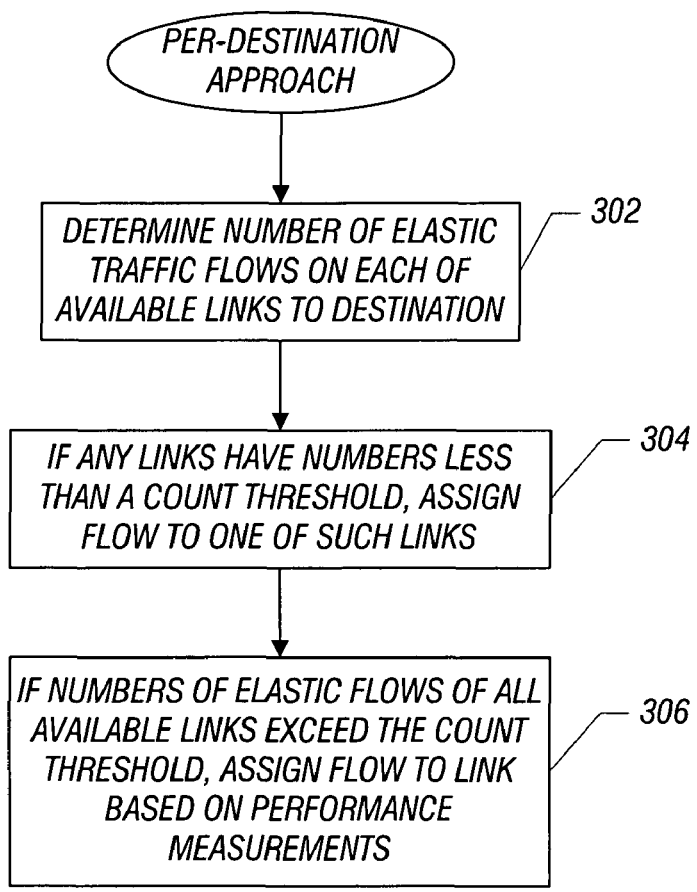
FIG. 3 is a flow diagram of a process of routing elastic traffic, according to an embodiment.

FIG. 3 shows a flow diagram of a route selection protocol that uses the per-destination approach, in accordance with an embodiment. The process depicted in FIG. 3 applies to selection of a path for a new elastic traffic flow. Note that packets associated with an existing elastic traffic flow are routed over the previous path that has already been selected. This is pursuant to the flow-based service where packets of a particular flow are routed over the same path as the first packet of the particular flow such that the packets do not arrive at the destination out of order.

The process of FIG. 3 is performed by one or more modules in a switch, where the one or more modules can be implemented with hardware and/or software. The switch determines (at 302) a number of elastic traffic flows on each of available links that belong to corresponding paths to a particular destination D. Each link to a corresponding next hop can already have one or more elastic traffic flows communicating over such link. Each link that has a number of elastic traffic flows to destination D less than a predefined minimum flow count, represented as MIN_NUMBER_FLOWS_PER_PATH, is identified as being part of a subgroup of one or more links. The new elastic traffic flow is assigned (at 304) to one of the links in the subgroup. This part of the routing protocol ensures that each of the candidate paths to destination D is carrying a minimum number of elastic traffic flows before flows are assigned based on performance measurements. The link that is assigned at 304 to the new elastic traffic flow is the link that carries the smallest number of traffic flows to destination D. Alternatively, selection of a link in the subgroup can be based on a round-robin algorithm or some other algorithm (e.g., random selection, etc.).

On the other hand, if the numbers of elastic traffic flows to destination D of all available links exceed or are equal to the predefined minimum flow count (in other words, all possible links belonging to alternate paths to destination D are carrying more than the minimum number of elastic traffic flows), then the new traffic flow is assigned (at 306) to a link based on performance measurements. Performance measurements can refer to measured throughputs of a particular link, for example. Other performance measurements can include other parameters, such as data rates, etc.

In some embodiments, elastic traffic can also be differentiated into different classes, such as by using different DSCP values. Thus, path selection can also be based on identifying a flow of elastic traffic from among plural classes of elastic traffic. Different sets of candidate paths can be allocated to corresponding different classes of elastic traffic. Thus, based on an identified class, the candidate paths considered are those paths that are part of the set for the identified class of elastic traffic.

Figure 4:
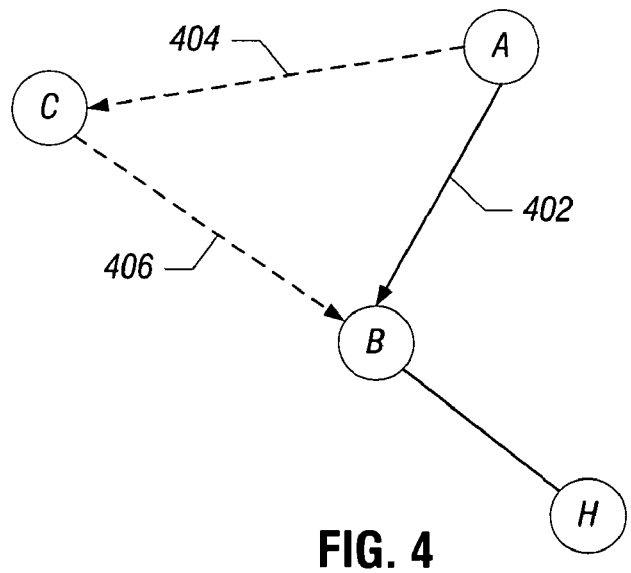
FIG. 4 illustrates example candidate paths for elastic traffic, according to an embodiment.

The assignment of an elastic traffic flow to a link based on performance measurements is described in the context of the example arrangement of FIG. 4, which has switches A, B, and C (switch B is the destination). The main path from A to B is represented by solid line 402, whereas the alternate path is represented by dashed lines 404 and 406. Let T1 represent the measured total throughput of TCP flows on path 402 (A-B), and N1 represent the number of TCP flows on path 402 (TCP flows traveling to the destination B). Let T2 represent the total throughput of TCP flows on the alternate path 404, 406 (A-C-B) to destination B, and N2 represent the number of TCP flows on A-C-B (TCP flows traveling to the same destination B). In assigning flow according to performance measurements (task 306 in FIG. 3), the routing protocol attempts to maximize the per-TCP flow throughput by achieving the same throughput for all TCP sessions traveling to the same destination on the candidate paths. Consequently, it is desirable for $$\frac{T1}{N1} = \frac{T2}{N2}.$$

Thus, according to the task 306 of FIG. 3, when a TCP flow reaches a switch, the switch selects the path i, where the highest TCP flow throughput $$\frac{Ti}{Ni+1}$$

can be achieved (note that the denominator is Ni+1 instead of Ni because the values of the TCP throughput are values after assignment of the new elastic traffic flow). Thus, in the example arrangement of FIG. 4, a comparison is made of $$\frac{T1}{N1+1}$$

with $$\frac{T2}{N2+1},$$

with the path corresponding to the higher value selected since that represents the path with the higher TCP throughput.

Each switch in a network that performs elastic traffic flow routing according to some embodiments has to keep two measurements: Ti and Ni. Ti is the total throughput of all TCP flows crossing a path (the outgoing link of that path) and traveling to a certain destination. Ni is the number of those TCP flows to the destination. Keeping a count of the number of TCP flows in the outgoing link of that path is straightforward. The calculation of Ti is discussed further below.

As noted above, one situation where achieving best throughput may not be realizable is when one or more of the TCP flows is a low throughput TCP flow. One example of a low throughput TCP flow is an acknowledgment flow, which is a flow for sending an acknowledgment message. Switches in some implementations may not be able to distinguish between a low throughput TCP flow and a normal throughput TCP flow.

However, by ensuring that each of the candidate paths to a given destination is carrying a minimum number of flows, MIN_NUMBER_FLOWS_PER_PATH, as discussed above, before assigning a new flow based on best throughput, the probability that all MIN_NUMBER_FLOWS_PER_PATH flows on a given link are low throughput is relatively low. The larger the threshold (MIN_NUMBER_FLOWS_PER_PATH), the lower the probability of all flows being low throughput flows. Moreover, even if a low throughput flow is routed over a particular link, that condition does not last long since eventually one of the low throughput flows will end and be replaced by a normal throughput flow. In some implementations, MIN_NUMBER_FLOWS_PER_PATH may be set greater than or equal to 5 to achieve acceptable performance. In other implementations, other values of MIN_NUMBER_FLOWS_PER_PATH can be used.

In the example of FIG. 4, when switch A receives a new flow for destination B, switch A can select one of two paths (a first path that includes link 402, and a second path that includes links 404, 406). Note that switch A has no knowledge about the load on link C-B (406). However, switch A does have an indication of that information in the average per-TCP flow throughput that is received by TCP flows traveling on A-C-B. Therefore, by looking at the average throughput received by TCP flows that have destination B and traveling on A-C-B and on A-B, switch A can make the best decision when routing the new flow.

As noted above, instead of using a per-destination approach as depicted in FIG. 3, a per-nexthop approach can be used where the per-destination requirement is dropped. In this approach, the values of $$\frac{Ti}{Ni+1}$$

are calculated for all TCP flows crossing a next hop regardless of their destination. For example, in FIG. 4, in the computation of $$\frac{Ti}{Ni+1}$$

for next hop C, all TCP flows A-C and all TCP flows A-C-B are considered. The path selection criteria is the same as in the per-destination approach: when a new TCP flow reaches a switch, the switch selects the path i where the highest TCP flow throughput can be achieved $$\left(\frac{Ti}{Ni+1}\right),$$

assuming that a minimum number of flows are present on each of the candidate paths. The per-nexthop approach is basically a special case of the pre-destination approach, where all TCP traffic flows going through each next hop, for all destinations, are used to compute the average TCP throughput, and the switch assigns a new TCP flow on the link where the per-TCP flow is expected to be highest.

With the per-nexthop approach, the path selection protocol is similar to the FIG. 3 approach, except that instead of considering just traffic flows to a destination, all traffic flows to all destinations are considered when a switch makes a decision to route a traffic flow over one of multiple candidate paths.

The solution for addressing low throughput flows in the per-nexthop approach can be the same as with the per-destination approach, where the value of the threshold MIN_NUMBER_FLOWS_PER_PATH is set high enough to reduce the likelihood that all flows over a particular path are low throughput flows.

Figure 5:
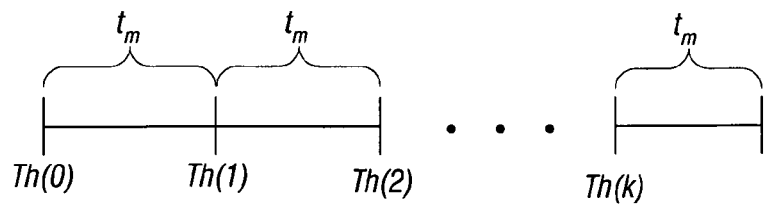
FIG. 5 illustrates throughput measurements of a network path, according to an embodiment.

As noted above, TCP flow throughput measurement is performed to enable application of the routing protocol according to some embodiments. In one embodiment, an aggregate throughput of TCP flows can be provided. As depicted in FIG. 5, a TCP flow throughput measurement can be made every $t_m$ period, where $t_m$ is some predefined time value. Generally, a throughput parameter Th(k) is defined as follows:

$$Th(k) = \frac{\text{amount of data sent by } TCP \text{ flows on a link to a given destination, during } t_m}{(t_m)}.$$

The throughput parameter, Th(k), thus represents the amount of data per unit of time ($t_m$). Note that in the per-nexthop approach, the value of Th(k) is equal to the amount of data sent by TCP flows on a link to all destinations, during $t_m$, divided by $t_m$.

As depicted in FIG. 5, a series of throughput parameter measurements are provided: Th(0), Th(1), . . . Th(k). Some type of a smoothing approach, such as exponential moving averaging, that takes into account an aggregation of Th(0), Th(1), . . . Th(k) can be performed. For example, a smoothed throughput ST(k+1) can be defined as:

$$ST(k+1)=[(1-\alpha)*Th(k+1)]+[\alpha*ST(k)]$$

Note that the calculation of ST(k+1) takes into account the previous value of ST(k), which is an aggregate of previous Th values. It is assumed that ST(0)=Th(0), and $0 \leq \alpha \leq 1$. In this manner, by using ST, path selection can be based on smooth values of the measured throughput to avoid fluctuations.

In other example implementations, other types of TCP flow throughput measurements can be used.

In certain types of traffic, such as traffic containing packets with DSCP values represented as "DF," a mixture of real-time and TCP traffic (mixture of inelastic and elastic traffic) may be present. In such a scenario, the mixed traffic is distributed, in a round-robin manner, among all candidate next hops. The number of mixed traffic flows on each candidate next hop is counted, and a new mixed traffic flow is assigned to the next hop that contains the least number of mixed traffic flows.

When TCP flows are fairly short-lived, it is assumed that on average, all links will be carrying a number of TCP flows, which would result in balanced per-TCP-flow throughput. However, in the presence of long-lived TCP flows, or when a new alternate link has just become available, it is possible to have some links carrying TCP flows with high throughput, while other links are carrying low throughput TCP flows, for extended periods of time. In such cases, it may help to perform periodic, TCP-flow load balancing for existing, idle TCP flows to ensure well-balanced TCP flows across all links.

A TCP flow would have to be idle for some predefined amount of time before being eligible for being moved to another link by the load-balancing mechanism. This ensures that this mechanism does not create out-of-order packets.

Figure 6:
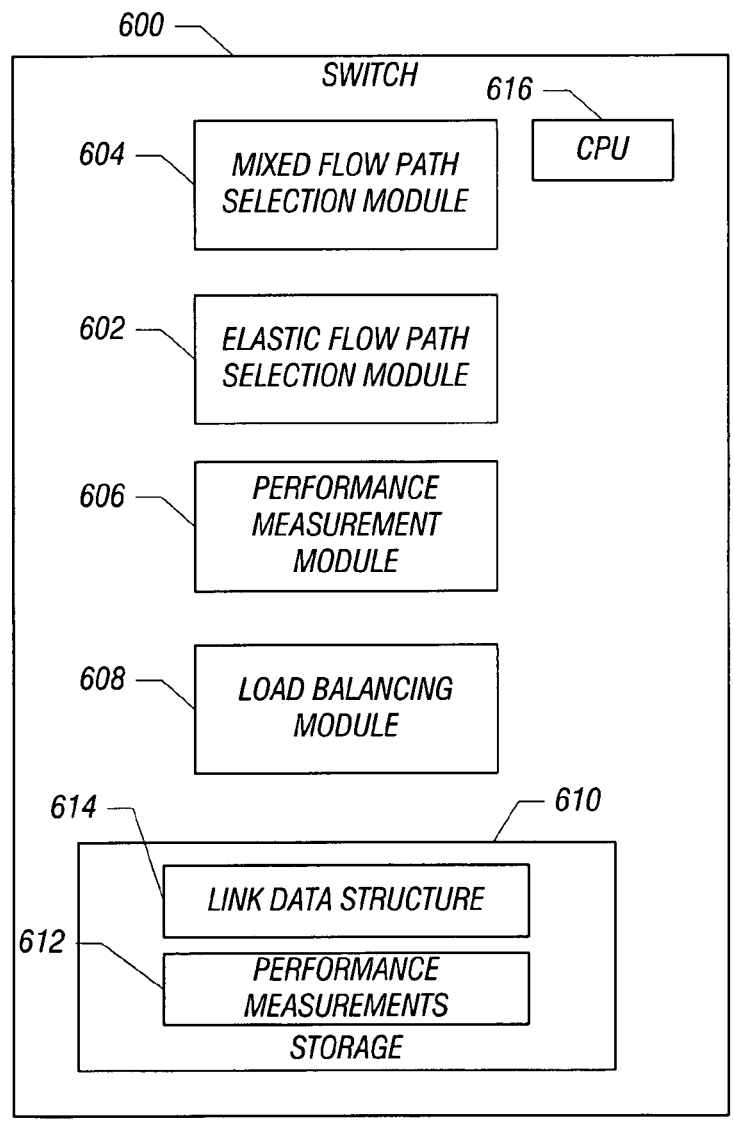
FIG. 6 is a block diagram of example components in a router according to an embodiment.

An example switch 600 is depicted in FIG. 6, where the switch can be any one of the switches depicted in FIG. 1 or 2. The switch 600 has an elastic flow path selection module 602 to perform path selection for elastic traffic flows as discussed above. Also, the switch 600 includes a mixed flow path selection module 604 for performing path selection for mixed traffic flows (where a mixed traffic flow contains both inelastic and elastic traffic), as described above.

The switch 600 also includes a performance measurement module 606 to measure performance parameters (e.g., aggregate TCP flow throughput) of corresponding links. Moreover, a load balancing module 608 performs load balancing, such as load balancing for idle TCP flows, as described above.

A storage 610 in the switch 600 includes performance measurements 612 that have been collected by the performance measurement module 606. Moreover, the storage 610 can store a link data structure 614 to store states of corresponding links connected to the switch 600. For example, a particular link may have experienced blackout, in which case the link data structure 614 can be updated to indicate that the particular link has experienced blackout. The link data structure can be updated when the link is no longer in a blackout condition.

The various modules 602, 604, 606, and 608 can be hardware modules, or alternatively, can be software modules executable on one or more central processing units (CPUs) 616 in the switch 600.

If the modules are implemented with software, instructions of such software can be executable on a processor (e.g., CPU(s) 616). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of routing a flow of elastic traffic, comprising:
   identifying, by a switch having a processor, plural candidate paths for the flow of elastic traffic; and
   selecting, by the switch, a particular path from among the plural candidate paths to route the flow of elastic traffic according to criteria comprising numbers of flows on respective candidate paths and measured performances of the respective candidate paths, wherein selecting the particular path comprises:
      in response to determining that a number of flows on at least one of the plural candidate paths is less than a predefined threshold, selecting the particular path based on comparing numbers of flows on respective candidate paths; and
      in response to determining that the number of flows on each of the plural candidate paths is greater than the predefined threshold, selecting the particular path based on the measured performances of the respective candidate paths.

2. The method of claim 1, wherein selecting the particular path is further based on identifying from among plural classes of the elastic traffic.

3. The method of claim 2, wherein the plural candidate paths are a set of paths allocated for the identified class of elastic traffic.

4. The method of claim 1, wherein selecting the particular path based on the measured performances of the respective candidate paths comprises selecting the particular path based on measured throughputs of the respective candidate paths.

5. The method of claim 4, wherein selecting the particular path based on the measured throughputs of the respective candidate paths comprises selecting the particular path based on the measured throughputs each defined as an amount of data in a predefined period of time.

6. The method of claim 4, wherein selecting the particular path based on the measured throughputs of the respective candidate paths comprises selecting the particular path based on smoothed measured throughputs.

7. The method of claim 1, wherein selecting the particular path based on comparing numbers of flows on respective candidate paths comprises selecting the particular path that has a least number of flows.

8. The method of claim 1, wherein identifying the plural candidate paths comprises identifying plural candidate paths to next hops.

9. The method of claim 1, wherein identifying the plural candidate paths comprises identifying plural physical links or virtual links.

10. The method of claim 1, wherein the identifying and selecting are part of a per-destination approach of path selection, and wherein the numbers of flows are numbers of flows to a particular destination, and wherein the measured performances are measured performances to the particular destination.

11. The method of claim 1, wherein the identifying and selecting are part of a per-nexthop approach of path selection, and wherein the numbers of flows are numbers of flows to multiple destinations, and wherein the measured performances are measured performances to the multiple destinations.

12. The method of claim 1, further comprising:
identifying a second traffic flow that is a mixed traffic flow containing both elastic traffic and inelastic traffic; and
using a different path selection protocol for the mixed traffic flow.

13. The method of claim 1, further comprising:
performing load balancing of multiple flows of elastic traffic across plural paths.

14. The method of claim 1, further comprising:
detecting a blackout condition; and
routing flows of elastic traffic over alternate paths in response to detecting the blackout condition.

15. A switch comprising:
a processor to:
  identify plural candidate paths for a new flow of elastic traffic;
  select a particular path from among the plural candidate paths to route the flow of elastic traffic according to criteria comprising numbers of flows on respective candidate paths and measured performances of the respective candidate paths, wherein the selection of the particular path comprises:
    determining whether a subgroup of the plural candidate paths exists where each of the one or more candidate paths in the subgroup has a number of flows less than a predefined threshold;
    in response to determining that the subgroup exists, selecting the particular path from the subgroup; and
    in response to determining that each of the plural candidate paths has a number of flows greater than or equal to the predefined threshold, selecting the particular path based on the measured performances.

16. The switch of claim 15, wherein the flow of elastic traffic comprises a Transmission Control Protocol (TCP) flow.

17. The switch of claim 15, wherein the processor is configured to further:
perform a different path selection algorithm for a mixed traffic flow that contains both elastic and inelastic traffic.

18. A network system comprising:
a plurality of switches, wherein at least one of the switches is configured to:
  receive a flow of elastic traffic;
  determine if any of plural candidate paths has a number of traffic flows less than a predefined threshold;
  in response to determining that any of the plural candidate paths has a number of traffic flows less than the predefined threshold, select a particular path from among the plural candidate paths based on comparing numbers of traffic flows of at least a subgroup of the candidate paths; and
  in response to determining that each of the plural candidate paths has a number of traffic flows greater than or equal to the predefined threshold, select a particular path from among the plural candidate paths based on measured performances of the plural candidate paths.

* * * * *